March 1, 1960 — R. S. LANIER ET AL — 2,926,936
SERVOMOTOR GEAR HEAD COUPLING
Filed Nov. 14, 1957

INVENTORS
REGINALD S. LANIER
HOLLIS B. MERRELL
JEROME F. MILLER
BY Williamson, Schroeder, Adams & Meyer
ATTORNEYS

2,926,936
SERVOMOTOR GEAR HEAD COUPLING

Reginald S. Lanier, Wayzata, Hollis B. Merrell, Excelsior, and Jerome F. Miller, Minneapolis, Minn., assignors to Washington Machine & Tool Works, Inc., Minneapolis, Minn., a corporation of Minnesota Application November 14, 1957, Serial No. 696,532

3 Claims. (Cl. 285—325)

This invention relates to a coupling between two cylindrical bodies and more particularly to a coupling between a servomotor and a gear head.

An object of the invention is to provide a new and improved coupling of simple and inexpensive construction for securing aligned ends of bodies together.

Another object of the invention is the provision of a novel coupling for securing aligned ends of bodies together and which coupling may be readily and easily applied to and removed from the bodies.

These and other objects and advantages of my invention will more fully appear from the following description made in connection with the accompanying drawings wherein like reference characters refer to the same or similar parts throughout the several views and in which.

Figure 1:
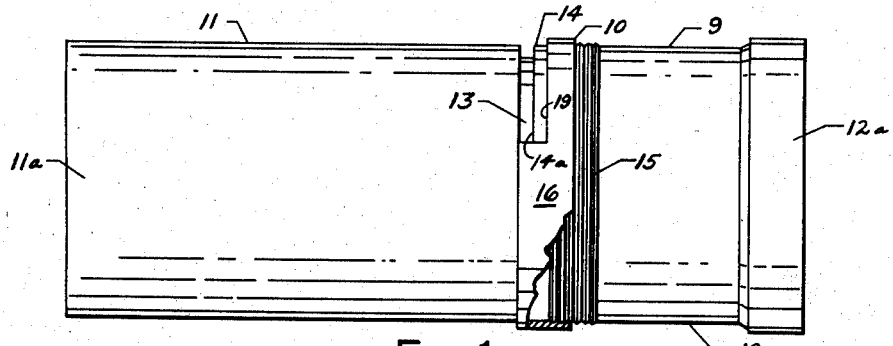
Fig. 1 is a side elevation view at approximately twice full scale of the motor gear head joined together by the coupling which is partly broken away to show detail.
Figure 2:
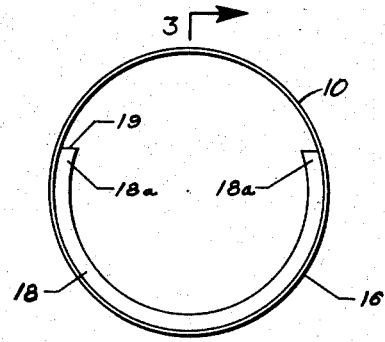
Fig. 2 is an end elevation detail view of the coupling.
Figure 3:
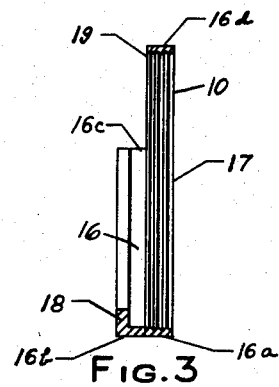
Fig. 3 is a section view taken on a plane as indicated at 3—3 in Fig. 2.

One form of the present invention is shown in the drawings and is described herein.

The present invention comprises a coupling, indicated in general by numeral 10 for joining together a pair of bodies such as a servomotor 11 and a gear head 12 and more specifically the housing 11a and 12a of the motor and gear head respectively. As best seen in Fig. 1, the motor and gear head housings are cylindrically shaped and are of substantially identical diameters and are to be positioned in end-to-end alignment with each other. The motor housing 11a has an annular groove 13 spaced inwardly from the end thereof to define an annular or circular out-turned flange 14. The flange 14 has inner and outer end surfaces 14a and 14b respectively, and when the motor is assembled with the gear head, the outer end surface 14b engages the end of the gear head housing 12a.

The gearhead housing 12a is provided with external threads 15 at the inner end thereof, and in the preferred form, the threads 15 are fine threads of low pitch.

The coupling 10 comprises an annular band 16 which is constructed of stiff but resiliently flexible spring steel. The band 16 has opposite end portions 16a and 16b which extend in axial directions, and the end portion 16a is provided with internal threads 17 coperatively formed to interfit with the threads 15 on the gear head housing 12a and to engage the gear head housing around the entire periphery thereof.

The other end portion 16b of the band 16 has an in-turned lip 18 for insertion into the groove 13 of the motor housing 11a. The end portion 16b is cut away at one side to define a notch 19 which extends inwardly, in an endwise direction through the lip 18 and inwardly therefrom a distance substantially equal to the thickness of flange 14 and the notch also extends peripherally of the band 16 through an obtuse arc of sufficient magnitude as to permit flange 14 to be received edgewise therethrough when the band is flexed. It will therefore be seen that the end portion 16b of the band, and the in-turned lip 18 extend peripherally through an arc which exceeds one hundred eighty degrees so that the circumferentially extending end portions 18a of the lip 18, and and the portions 16c of the band engage and grip the flange 14 and the motor housing 11a in overcenter relation with respect to the center of the motor housing so that the coupling may not be removed from the motor housing without being sprung or flexed.

Figure 4:
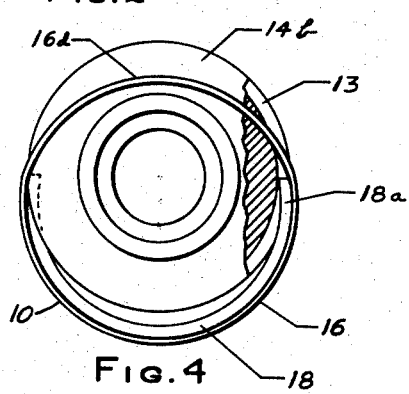
Fig. 4 is a detail end elevation view partly broken away of the motor and coupling and showing the coupling in an intermediate stage of assembly with the motor.

When the coupling is to be applied for holding the motor and gear head together, the flange 14 is inserted edgewise through the notch 19 of band 16. The circumferentially extending end portions 18a of lip 18 engage the bottom of the groove 13, and the portions 16c of the band engage the flange 14, and as the band 16 is forced across the motor housing, the band 16 is sprung to a somewhat oval or out-of-round condition, substantially as seen in Fig. 4. As the portions 18a and 16c are sprung outwardly from each other, the portion 16d of the band springs inwardly.

Figure 5:
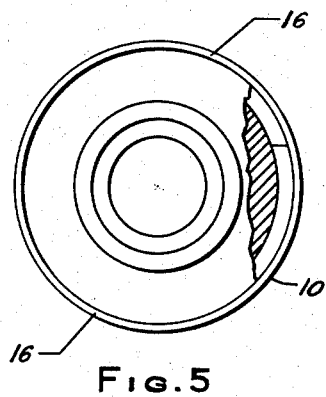
Fig. 5 is a view similar to Fig. 4 and being partly broken away, and showing the coupling completely assembled with the motor.

As the band 16 is moved into the position shown in Fig. 5, it returns by means of its own resiliency to substantially annular shape. The gear head 12 is then threaded into the end portion 16a of the band 16 so as to secure the gear head to the motor, and further to peripherally engage the threaded end portion 16a of the band and prevent inward flexing of the upper portion 16d thereof. The disassembly of the coupling 10 from the motor 11 is thereby prevented because inward flexing or springing of the portion 16d is required to permit outward flexing of the portions 16c and 18a of the coupling.

When the gear head is threaded inwardly into the band 16, the end surfaces of the motor housing and gear head will abut against each other and will be held securely together by the threaded connection between the coupling and the gear head and by the lip 18 which bears against the inner surface 14a of the flange 14.

It will be understood that the external threads on the gear head 12 and the internal threads on the end portion 16a of band 16 comprise only one means of securing the band and gear head together and for causing such peripheral engagement between the gear head and the end portion 16a as to prevent inward flexing of the portion 16d of the band when assembled.

It will be understood that we have provided a new and improved coupling which is readily and easily applicable to a pair of cylindrical bodies for securely fastening the bodies together in end-to-end and aligned relation with respect to each other. It should be apparent that the coupling provides snap-on attachment to one of the bodies and after the second body is attached to the coupling, the coupling is prevented from becoming disassembled with the first body.

It will, of course, be understood that various changes may be made in the form, detail, arrangement and proportion of the parts without departing from the scope of my invention which consists of the matter described herein and set forth in the appended claims.

What is claimed is:

1. A coupling for joining the ends of a pair of bodies, one of which has an out-turned circular flange, said coupling comprising a resiliently flexible continuous band having end portions extending in axially opposite directions, one end portion being substantially semicircular and dimensioned to encompass a major portion of the flange in snugly fitting relation thereto, said one end portion having inwardly directed projecting means to abut behind and against the flange and retain the flange in the coupling, the other end portion of the band being joined rigidly to said one end portion in close juxtaposition thereto, said other end portion being peripherally closed and the peripheral extent of said one end portion being greater than 180° with the terminal ends thereof being spaced apart a distance less than the inside diameter of such one end portion, said coupling being flexible to the extent of permitting deformation of the band into a flattened condition sufficient to spread the ends of said one end portion in spaced apart relation a distance at least as great as the inside diameter of said one end portion whereby said one body and particularly its flange may be engaged edgewise into said one end portion of the coupling, said other end portion of the band being engageable around and to the other of said pair of bodies whereby such other end portion is maintained in shape conforming therewith to consequently retain said terminal ends of said one end portion in spaced apart relation less than the inside diameter of said one end portion and thereby prevent separation of the pair of bodies.

2. The assembly as defined in and by claim 1 wherein said inwardly directed projecting means includes a lip extending around the periphery of said substantially semicircular one end portion whereby to engage behind and against said flange.

3. The assembly as defined in and by claim 1 wherein said other end portion has a circular threaded inner surface for threaded engagement upon the other of said pair of bodies.

References Cited in the file of this patent

UNITED STATES PATENTS

| | | |
|---|---|---|
| 266,862 | Meyrick et al. | Oct. 31, 1882 |
| 531,425 | Porteous | Dec. 25, 1894 |
| 594,526 | Glauber | Nov. 30, 1897 |
| 787,154 | Delehant | Apr. 11, 1905 |
| 1,334,306 | Liberty | Mar. 23, 1920 |
| 1,564,965 | Kraft | Dec. 8, 1925 |
| 2,286,105 | Quinn | June 9, 1942 |
| 2,353,012 | Cheney | July 4, 1944 |

FOREIGN PATENTS

| | | |
|---|---|---|
| 937,680 | Germany | Dec. 15, 1955 |